US009304313B1

(12) United States Patent  (10) Patent No.: US 9,304,313 B1
Barchers  (45) Date of Patent: Apr. 5, 2016

(54) SIMPLIFIED SYSTEM AND METHOD FOR COMPENSATED LASER BEAM PROPAGATION

(71) Applicant: Jeffrey D Barchers, Boulder, CO (US)

(72) Inventor: Jeffrey D Barchers, Boulder, CO (US)

(73) Assignee: Nutronics, Inc., Boulder, CO (US)

( * ) Notice: Subject to any disclaimer, the term of this patent is extended or adjusted under 35 U.S.C. 154(b) by 206 days.

(21) Appl. No.: 14/283,792

(22) Filed: May 21, 2014

(51) Int. Cl.
 *G01J 1/20* (2006.01)
 *G02B 26/06* (2006.01)
 *G01J 1/24* (2006.01)

(52) U.S. Cl.
 CPC .. *G02B 26/06* (2013.01); *G01J 1/24* (2013.01)

(58) Field of Classification Search
 CPC .................................. G02B 26/06; G01J 9/00
 USPC ....................................................... 250/201.9
 See application file for complete search history.

(56) References Cited

U.S. PATENT DOCUMENTS

| | | | |
|---|---|---|---|
| 4,028,702 A | 6/1977 | Levine | |
| 4,635,299 A | 1/1987 | MacGovern | |
| 4,814,774 A | 3/1989 | Herczfeld | |
| 6,452,146 B1 | 9/2002 | Barchers | |
| 6,683,291 B2 | 1/2004 | Barchers | |
| 7,343,098 B2 | 3/2008 | Gerwe et al. | |
| 7,402,785 B2 | 7/2008 | Barchers | |
| 8,076,624 B1 | 12/2011 | Barchers | |
| 2012/0018614 A1* | 1/2012 | King | G02B 26/06 250/201.9 |

OTHER PUBLICATIONS

Jeffrey D. Barchers, "Closed-loop stable control of two deformable mirrors for compensation of amplitude and phase fluctuations", J. Opt. Soc. Am. A/vol. 19, No. 5/May 2002.
Jeffrey D. Barchers and Troy A. Rhoadarmer, "Evaluation of phase-shifting approaches for a point-diffraction interferometer with the mutual coherence function", Applied Optics, vol. 41, No. 36, Dec. 20, 2002.
JD Barchers and BL Ellerbroek, "Improved Compensation of turbulence-induced amplitude and phase distorsions by means of multiple near-field phase adjustments", J. Opt. Soc. Am. A, vol. 18, No. 2/Feb. 2001.
Jeffrey D. Barchers, "Evaluation of the impact of finite-resolution effects on scintillation compensation using two deformable mirrors", J. Opt. Soc. Am. A/vol. 18, No. 12, Dec. 2001.

(Continued)

*Primary Examiner* — Thanh Luu
(74) *Attorney, Agent, or Firm* — Patent Law Offices of Rick Martin, P.C.

(57) ABSTRACT

A System and Method for Joint Compensation of Turbulence-induced-aberration and Laser Source Aberrations to provide measurement and compensation of aberrations in a laser beam projected from a laser source and the aberrations induced by propagation through an optical system and through a turbulent medium to a target utilizing only a single primary phase correction device means in the projected laser beam path and a secondary phase correction device means incorporated into the wavefront sensor path while at the same time the corrections are made using strictly null-seeking feedback control loops, thus providing a robust means of compensation. Reduction of the number of phase correction device means in the projected laser beam path can reduce cost, size, weight, and power compensation of the compensation system when the projected laser beam is a high energy laser.

44 Claims, 2 Drawing Sheets

(56) References Cited

OTHER PUBLICATIONS

Troy A. Rhoadarmer and Jeffrey D. Barchers, "Noise analysis for complex field estimation using a self-referencing interferometer wave front sensor" Proc. SPIE 4825, High-Resolution Wavefront Control: Methods, Devices, and Applications IV, 215 (Nov. 1, 2002); doi:10.1117/12.450472;http://proceedings.spiedigitallibrary.org/proceeding.aspx?articleid=1314454, presented Jul. 7, 2002.

Kenneth W. Billman, Bruce A. Horwitz, Paul L. Shattuck, "Airborne Laser System Common Path/Common Mode Design Approach", Part of the SPIE Conference on Airborne Laser Advanced Technology II, Orlando, FL, Apr. 1999, SPIE vol. 3706.

Jeffrey D. Barchers, David L. Fried, and Donald J. Link, "Evaluation of the performance of Hartmann sensors in strong scintillation", Applied Optics, vol. 41, No. 6, Feb. 20, 2002.

Jeffrey D. Barchers and David L. Fried, "Optimal control of laser beams for propogation through a turbulent medium", Optical Society of America. A, vol. 19, No. 9, Sep. 2002.

Chris Shelton, Mitchell Troy, Antonin Bouchez, Jennifer Roberts, Thang Trinh, Tuan Truong, "NGS and LGS Adaptive Optics Improving faint light performance", Sep. 14, 2006; NASA/JPL Presentation http://ao.jpl.nasa.gov/Palao/Presentations/Shelton_PSM06.pdf.

Roberto Ragazzoni, "Pupil plane wavefront sensing with an osciallating prism", Journal of Modern Optics, 1996, vol. 43, No. 2, 289-293.

Brignon, ED. "Coherent Laser Beam Combining", Wiley-VCH, Weinheim Germany, 2013.

* cited by examiner

SIMPLIFIED SYSTEM AND METHOD FOR COMPENSATED LASER BEAM PROPAGATION

CROSS-REFERENCE TO RELATED APPLICATIONS

No related applications

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

FIELD OF INVENTION

The present invention relates to a method and several system implementations for an adaptive optical system for projection of laser beams through a turbulent medium with a cooperative or non-cooperative target. The method is adaptable for use with a broad range of laser sources. The method incorporates an inherent means to compensate for aberrations in the projected laser source beam in an efficient manner. The particular advantage of the present invention is that only a single phase correction device in the projected laser beam path is required to compensate for both the laser source aberrations and the aberrations in the turbulent medium while at the same time the corrections are made using strictly null-seeking feedback control loops, thus providing a robust means of compensation. A cooperative target refers to a target in which a laser beacon is provided directly by the target for wavefront sensing, whereas a non-cooperative target refers to a target in which no laser beacon is provided directly by the target for wavefront sensing.

BACKGROUND OF THE INVENTION

Adaptive optical system technology has found a wide range of applications including astronomical imaging and long-range free space optical communication. Adaptive optical system technology can potentially enhance any application in which turbulence occurs along the path, leading to refractive index fluctuations due to temperature variations. This turbulence degrades the performance of an imaging or laser projection system. Prior art methods (Ref. 1-15), as referenced in the references cited section below, have been developed to provide methods for compensation of the effects of turbulence on laser propagation through the atmosphere. In particular, the method described jointly by Refs. 14 and 15, was developed to jointly provide compensation of aberrations in both the laser source and those aberrations induced by propagation through a turbulent medium. The method described in Ref. 15 requires two phase correction devices to effect this joint compensation. The method described in Refs. 14 and 15 offers the particular advantage of nulling aberrations in the "Aperture Sharing Element" or ASE. The ASE is an optical element in a laser beam projection system that is typically highly reflective at the wavelength and/or polarization of the outgoing laser beam but is highly transmissive at the wavelength and/or polarization of the laser beam received from the direction of the target (either cooperative or non-cooperative) that is used for wavefront sensing to measure the aberrations in the turbulent medium. Aberrations in the ASE can be significant, particularly in the case of applications in which the projected laser beam is a High Energy Laser (HEL) and can induce thermal aberrations in the ASE. A disadvantage of the method in Ref. 14 is that the aberrations in the HEL and ASE are measured in an "open loop" fashion without feedback. This leads to significant errors when the system is not perfectly aligned and/or can lead to non-trivial calibration errors. A disadvantage of the method in Ref. 15 is that two phase correction devices are required in the beam path of the projected laser beam. Particularly for applications that project a HEL the phase correction device becomes a critical single point failure for the laser beam projection system. Furthermore, phase correction devices suitable for use in a high power beam path are very expensive. In addition, the drive electronics for a phase correction device that is suitable for use in a high power beam path are typically heavy, bulky, and consume a significant amount of power.

What is needed is a method for joint compensation of aberrations induced by both propagation through a turbulent medium and the aberrations in a laser beam (including the aberrations induced by reflection from the ASE) utilizing only a single phase correction device in the projected laser beam path while at the same time the corrections are made using strictly null-seeking feedback control loops, thus providing a robust means of compensation. The present invention meets these needs by providing a configuration that provides joint compensation of aberrations induced by propagation through a turbulent medium and the aberrations in a laser beam (including the aberrations induced by reflection from the ASE) utilizing only a single phase correction device in the projected laser beam path and a secondary phase correction device incorporated into the wavefront sensor path while at the same time the corrections are made using strictly null-seeking feedback control loops, thus providing a robust means of compensation. The second phase correction device operates in the sensor path with very low incident optical power and thus can be a very compact device with minimal cost, minimal weight and minimal power consumption requirements. The present invention utilizes two wavefront sensors: one to measure the aberrations in the path from the ASE to the target and a second to measure the aberrations in the laser beam source and the aberrations induced by propagation from the laser beam source to the ASE (including reflection from the ASE). Any method for wavefront sensing that is appropriate to measure the induced aberrations is compatible for use with the present invention.

U.S. Pat. No. 8,076,624 issued Dec. 13, 2011 from U.S. patent application Ser. No. 12/324,041 filed Sep. 19, 2008 is fully incorporated herein by reference and provides a wavefront sensing and control technique to measure the aberrations along the propagation path from the target to the ASE using return from an ultra-short coherence length laser forming a controllable focused laser beacon at a non-cooperative target, regardless of the surface depth of the target.

U.S. patent application Ser. No. 12/962,163 filed Dec. 7, 2010 is fully incorporated herein by reference and provides a wavefront sensing and control technique to measure the aberrations along the propagation path from the target to the ASE using return from the combination of a short pulse laser source and the depth of the target surface at the aimpoint to form a controllable focused laser beacon at the target.

U.S. patent application Ser. No. 13/732,793 filed Jan. 2, 2013 is fully incorporated herein by reference and provides a wavefront sensing and control technique to measure the aberrations along the propagation path from the target to the ASE using return from the combination of a short coherence length laser source and the depth of the target surface at the aimpoint to form a controllable focused laser beacon at the target.

U.S. patent application Ser. No. 14/283,463 filed May 21, 2014 is fully incorporated herein by reference and provides a wavefront sensing and control technique to measure the aberrations along the propagation path from the target to the ASE that minimizes signal required for the wavefront sensor.

U.S. Pat. No. 4,635,299 issued Jan. 6, 1987 is fully incorporated herein by reference and provides a system and method for providing measurement and compensation of aberrations in a laser beam projected from a laser source and the aberrations induced by propagation through an optical system and through a turbulent medium to a target.

The present invention provides for an alternate system and method for providing measurement and compensation of aberrations in a laser beam projected from a laser source and the aberrations induced by propagation through an optical system and through a turbulent medium to a target utilizing only a single primary phase correction device in the projected laser beam path and a secondary phase correction device incorporated into the wavefront sensor path.

REFERENCES CITED

1. *Evaluation of phase-shifting approaches for a point-diffraction interferometer with the mutual coherence function.* Barchers, J. D. and Rhoadarmer, T. A. December 2002, Applied Optics, Vol. 41, pp. 7499-7509.
2. *Improved compensation of amplitude and phase fluctuations by means of multiple near field phase adjustments.* Barchers, J. D. and Ellerbroek, B. L. February 2001, Journal of the Optical Society of America A, Vol. 18, pp. 399-411.
3. *Closed loop stable control of two deformable mirrors for compensation of amplitude and phase fluctuations.* Barchers, J. D. 2002, Journal of the Optical Society of America A, Vol. 19, pp. 926-945.
4. *Evaluation of the impact of finite resolution effects on scintillation compensation using two deformable mirrors.* Barchers, J. D. 2001, Journal of the Optical Society of America A, Vol. 18, pp. 3098-3109.
5. *Optimal control of laser beams for propagation through a turbulent medium.* Barchers, J. D. and Fried, D. L. September 2002, Journal of the Optical Society of America A., Vol. 19, pp. 1779-1793.
6. Barchers, J. D. Optimal beam propagation system having adaptive optical systems. U.S. Pat. No. 6,638,291 U.S.A, Jan. 27, 2004.
7. Electro-optical field conjugation system. U.S. Pat. No. 6,452,146 U.S.A., Sep. 17, 2002.
8. Non-cooperative laser target enhancement system and method. U.S. Pat. No. 8,076,624 Issued Dec. 13, 2011, from U.S. patent application Ser. No. 12/234,041 U.S.A, Sep. 19, 2008.
9. Target Feature Integrated Laser Field Conjugation System. Application Ser. No. 12/962,163 U.S.A, filed Dec. 7, 2010.
10. Modulated Interferometric Target Feature Wavefront Sensor Ser. No. 13/732,793 U.S.A, 2 Jan. 2013.
11. *Noise analysis for complex field estimation using a self-referencing interferometer wavefront sensor.* Rhoadarmer, T. A. and Barchers, J. D. 2002, Proc. SPIE, Vol. 4825, pp. 215-227.
12. Barchers, J. D. System and method for correction of turbulence effects on laser or other transmission. U.S. Pat. No. 7,402,785 U.S.A, Jul. 22, 2008.
13. Belenkii, M. S. Beaconless adaptive optics system. U.S. patent application Ser. No. 12/157,014 U.S.A, Jun. 6, 2008.
14. MacGovern, Alan J., Discrete phase conjugate technique for precompensation of laser beams transmitted through turbulence. U.S. Pat. No. 4,635,299, Jan. 6, 1987.
15. *Airborne Laser System Common Path/Common Mode Design Approach.* Billman, K. W., Horwitz, B. A., and Shattuck, P. L., 1999, Proc. SPIE, Vol. 3706, pp. 196-203.
16. Barchers, J. D. System and Method for Low Signal Knife Edge Wavefront Sensing in an Adaptive Optical System Ser. No. 14/283,463 U.S.A., May 21, 2014.
17. *Evaluation of the performance of Hartmann Sensors in Strong Scintillation.* Barchers, J. D., Fried, D. L., and Link, D. J. 2002, Applied Optics, Vol. 41, pp. 1012-1021.

SUMMARY OF THE INVENTION

The primary aspect of the present invention is to provide a system and method for providing measurement and compensation of aberrations in a laser beam projected from a laser source and the aberrations induced by propagation through an optical system and through a turbulent medium to a target utilizing only a single primary phase correction device in the projected laser beam path and a secondary phase correction device incorporated into the wavefront sensor path while at the same time the corrections are made using strictly null-seeking feedback control loops, thus providing a robust means of compensation. The method is suitable for use with a broad range of laser sources, including continuous wave and pulsed laser sources, cooperative and non-cooperative targets. The method is suitable for use with a broad range of wavefront sensor options.

A brief summary of the present invention is provided here. The present invention is a compensated laser beam projection system that includes a projected laser source (100) that produces a projected laser beam (101) which is split by an aperture sharing element means (104) that functions to produce a majority projected laser beam sample (205) and a minority projected laser beam sample (230). The majority projected laser beam sample (205) is transmitted through a first optical system means (110) that includes a primary phase correction device means (206). The first optical system means (110) functions to direct the majority projected laser beam sample (205) through a turbulent medium (112) to a target (113). The primary phase correction device means (206) functions to pre-compensate the phase of the majority projected laser beam sample (205) to focus the beam through the turbulent medium (112) to the target (113). The minority projected laser beam sample (230) is transmitted through the aperture sharing element means (104) to a retro-reflector array means (131) that functions to provide a sampled conjugation of a wavefront phase of the minority projected laser beam sample (230) to produce a pseudo-conjugated minority projected laser beam sample (232). The pseudo-conjugated minority projected laser beam sample (232) reflects from the front surface of said aperture sharing element means (104) and is then transmitted through a second optical system means (223) that includes a secondary phase correction device means (224) to produce the compensated projected laser beam sample (234). The second optical system means (223) functions to direct the compensated projected laser beam sample (234) to a beam splitter means (126) that functions to direct the compensated projected laser beam sample (234) to a projected laser wavefront sensor (135) for measurement of a wavefront phase of the compensated projected laser beam sample (234). The secondary phase correction device means (224) functions to null the wavefront phase of the compensated projected laser beam sample (234) that is measured by the projected laser wavefront sensor (135). A beacon beam (120) is transmitted from the target (113), through the turbulent medium (112), through said first optical system means (110) that includes a primary phase correction device means (106) to produce a partially compensated beacon beam (221), and then passes through said aperture sharing element means (104) to produce a partially compensated beacon beam sample (222). Next, the partially compensated beacon beam sample (222) is then directed through said second optical system means (223) that includes said secondary phase correction device means (224) that functions to produce a compensated beacon beam sample (225) and functions to direct said compensated beacon beam sample (225) to said beam splitter means (126) that also functions to direct the compensated beacon beam sample (225) to a beacon wavefront sensor means (127) for measurement of a wavefront phase of the compensated beacon beam sample (225). The beacon wavefront sensor means (127) produces a beacon error signal (228) that is used by a beacon real time processor means (140) that functions to control a wavefront phase of the primary phase correction device means (206) to null the wavefront phase of the compensated beacon beam sample (225) observed on said beacon wavefront sensor means (127). The projected laser wavefront sensor means (135) produces a projected laser error signal (236) that is used by a projected laser real time processor means (150) that functions to control a wavefront phase of the secondary phase correction device means (224) to null the wavefront phase of the compensated projected laser beam sample (234) observed on said laser wavefront sensor (135).

The beacon wavefront sensor means (127) can be implemented by numerous methods well known to those skilled in the art, including but not limited to: a gain-calibrated knife edge wavefront sensor (Ref. 16), a conventional Hartmann sensor in the Fried-geometry, a conventional Dual-Hartmann sensor in the Hutchin-geometry (Ref. 17), or a Self-Referencing Interferometer (Ref. 11, Ref. 12). The projected laser wavefront sensor means (135) can be implemented by numerous methods well known to those skilled in the art, including but not limited to: a gain-calibrated knife edge wavefront sensor (Ref. 16), a conventional Hartmann sensor in the Fried-geometry, a conventional Dual-Hartmann sensor in the Hutchin-geometry (Ref. 17), or a Self-Referencing Interferometer (Ref. 11, Ref. 12). In combination, the beacon wavefront sensor means (127) and the beacon beam (120) can be implemented such that the method of target feature adaptive optics is utilized (Ref. 9 or 10).

The beacon beam (120) can originate at the target (113) by numerous means well known to those skilled in the art, including but not limited to: active laser illumination of the target, reflected sunlight or reflected ambient light from the target, projection of a laser beam from the target, or thermal emission from the target.

Other aspects of this invention will appear from the following description of the drawings and appended claims, reference being made to the accompanying drawings forming a part of this specification wherein like reference characters designate corresponding parts in the several views.

BRIEF DESCRIPTION OF THE DRAWINGS

FIG. 1 illustrates the measurement and joint compensation of aberrations induced by propagation through a turbulent medium and the aberrations in a laser beam (including the aberrations induced by reflection from the aperture sharing element means) utilizing a conventional primary phase correction device means and a projected laser phase correction device means in the projected laser beam path.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Figure 1:
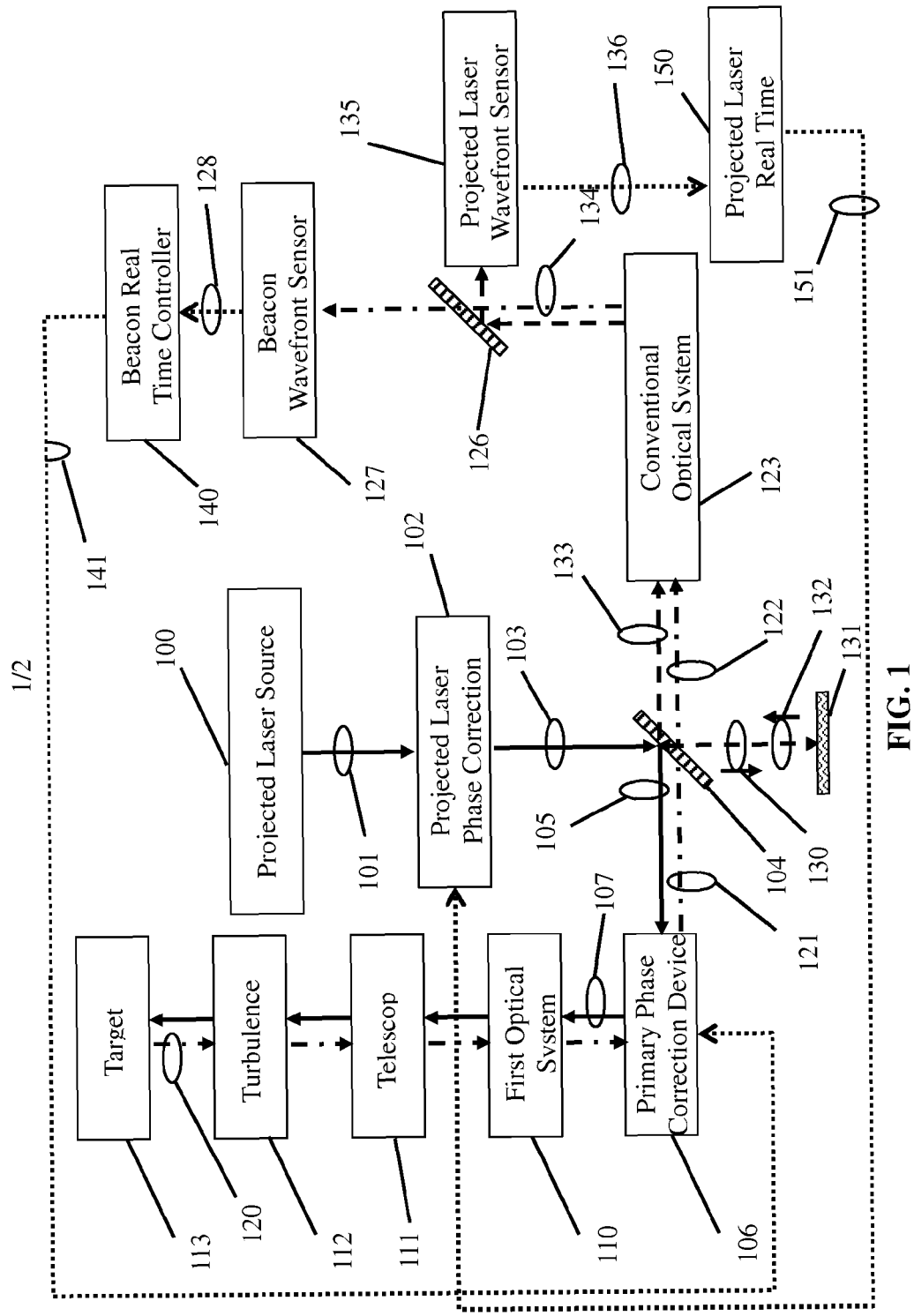
FIG. 1 is a schematic of prior art comprised of the combined configuration described by Ref. 14 and Ref. 15.

FIG. 1 is a schematic of prior art comprised of the combined configuration described by Ref. 14 and Ref. 15. FIG. 1 illustrates the measurement and joint compensation of aberrations induced by propagation through a turbulent medium and the aberrations in a laser beam (including the aberrations induced by reflection from the aperture sharing element means) utilizing a conventional primary phase correction device means 106 and a projected laser phase correction device means 102 in the projected laser beam path. FIG. 1 is shown by way of example and not of limitation. There are alternate means of displaying the laser path(s) as those skilled in the art would recognize. Shown in FIG. 1 is the projected laser source 100. The projected laser source 100 produces the projected laser beam 101. The projected laser beam 101 encounters a projected laser phase correction device means 102 whose primary function is to compensate for aberrations in the projected laser beam 101 to produce the partially compensated projected laser beam 103. The exact means by which this is accomplished will be clear as the description proceeds. The projected laser phase correction device means 102 is understood to be implemented by one of numerous means well known to those skilled in the art, including but not limited to a continuous facesheet deformable mirror, a segmented deformable mirror, or a liquid crystal phase correction device means. The projected laser phase correction device means 102 could be a plurality of devices in series if this is required to meet dynamic range and/or sampling requirements.

The partially compensated projected laser beam 103 encounters an aperture sharing element means 104 which produces a majority partially compensated projected laser beam sample 105 and a minority partially compensated projected laser beam sample 130. The majority partially compensated projected laser beam sample 105 transmits to a conventional primary phase correction device means 106 which applies phase correction for joint compensation of aberrations induced by propagation through a turbulent medium and the aberrations in a laser beam (including the aberrations induced by reflection from the ASE) to produce the pre-compensated projected laser beam 107. The conventional primary phase correction device means 106 is understood to be implemented by one of numerous means well known to those skilled in the art, including but not limited to a continuous facesheet deformable mirror, a segmented deformable mirror, or a liquid crystal phase correction device means. The conventional primary phase correction device means 106 could be a plurality of devices in series if this is required to meet dynamic range and/or sampling requirements.

After compensation by the phase correction device means, the pre-compensated projected laser beam 107 transmits through a first optical system means 110 which relays the pre-compensated projected laser beam 107 to a transmitting telescope 111, also commonly known as a beam director, a turbulent medium 112, and to a target 113. It is understood by those skilled in the art that the first optical system means 110 should include additional mirrors and optics required for pointing and stabilization of the beam propagation path from the projected laser source 100 to the target 113. There are numerous means to implement pointing and stabilization well known to those skilled in the art.

We illustrate the correction applied to the compensated projected laser beam 107 mathematically at this point. The sum of the aberrations from the projected laser source 100 to the aperture sharing element means 104 is denoted by h. The sum of the aberrations from the aperture sharing element means 104 to the target 113 is denoted by a. The surface figure of the aperture sharing element means 104 is denoted by $ASE_F$. By inventor-selected convention, the sign of the aberration due to reflection from the aperture sharing element means 104 is negative and thus the aberration experienced by the projected laser beam 101 at the aperture sharing element means 104 due to reflection is $-2ASE_F$. The correction applied by the conventional primary phase correction device means 106 is denoted by $c_p$. The correction applied by the projected laser phase correction device means 102 is denoted by $c_s$. Thus, the net aberration, $\phi_p$, experienced by the pre-compensated projected laser beam 107 is given by:

$$\phi_p = h + a + c_p + c_s - 2ASE_F. \quad (Eq\ 1)$$

It is understood that the correction applied by the conventional primary phase correction device means 106 and projected laser phase correction device means 102 denoted by $c_p + c_s$ should be defined (by as yet unspecified logic) to be such that it corrects the entire propagation path from the projected laser source 100 to the target 113, i.e. the correction applied by the conventional primary phase correction device means 106 and projected laser phase correction device means 102 should be, $$c_p + c_s \Rightarrow -h - a + 2ASE_F. \quad (Eq\ 2)$$

The means by which this desired correction is achieved will be clear shortly.

A beacon laser beam 120 is formed at the target by one of numerous means well known to those skilled in the art. If the target is a cooperative target then the beacon laser beam 120 is formed within the target 113 and projected by an optical system within the target 113 toward the telescope 111. If the target is a non-cooperative target, then the beacon laser beam 120 is formed by one of numerous means well known to those skilled in the art to form a reflected signal from the target 113 that can be used as a beacon laser source. Such methods include, but are not limited to, those methods described in Ref. 8-10. The beacon laser beam 120 propagates back through the turbulent medium 112, the telescope 111, and the optical system 110 which directs the beam to the conventional primary phase correction device means 106 to form the conventionally compensated beacon beam 121.

The conventionally compensated beacon beam 121 transmits through the aperture sharing element means 104 to obtain the conventionally compensated beacon beam sample 122. The conventionally compensated beacon beam sample 122 propagates through a conventional optical system means 123 which relays and directs the conventionally compensated beacon beam sample 122 to a beam splitter means 126 that separates light from the wavelength and/or polarization of the conventionally compensated beacon beam sample 122 from light at the wavelength and/or polarization of the compensated minority projected laser beam sample 133. After passing through the beam splitter means 126 the conventionally compensated beacon beam sample 122 is received by the beacon wavefront sensor means 127.

The net aberration, $w_b$, experienced by the conventionally compensated beacon beam sample 122 and measured by the beacon wavefront sensor means 127 is given by, $$w_b = a + c_p + (n-1)ASE_F + (n-1)ASE_{BR} + NCP. \quad (Eq\ 3)$$

where n is the refractive index of the aperture sharing element means 104, $ASE_F$ is the surface figure aberration of the front surface of the aperture sharing element means 104, $ASE_{BR}$ is the surface figure aberration of the back surface of the aperture sharing element means 104 in the receive propagation direction associated with propagation from left to right in the orientation of FIG. 1, and NCP is the net contribution of all other aberration sources from the aperture sharing element means 104 to the beam splitter means 126. It is assumed that aberrations from the beam splitter means 126 to the beacon wavefront sensor means 127 are well calibrated and negligible.

The discussion of FIG. 1 now returns to the partially compensated projected laser beam 103. In addition to the majority partially compensated projected laser beam sample 105 produced by reflection from the aperture sharing element means 104, there is a minority partially compensated projected laser beam sample 130 produced by transmission through the aperture sharing element means 104. The minority partially compensated projected laser beam sample 130 encounters a retro-reflecting array means 131 that provides local pseudo-conjugation of the wavefront of the minority partially compensated projected laser beam sample 130. The retro-reflecting array means 131 can be fabricated using numerous methods well known to those skilled in the art, including, but not limited to an array of corner cubes (as in Ref. 14 and Ref. 15) or an array of Cat-Eye lenses, with the former generally having a larger acceptance angle and the latter having the advantage of not having facets that can cause phase aberrations at a frequency beyond that of the retro-reflecting array. The pitch of the retro-reflecting array means 131 should match the effective pitch of the projected laser phase correction device means 102 actuator correction elements and should match the sampling pitch of the projected laser wavefront sensor means 135. Reflection of the minority partially compensated projected laser beam sample 130 produces the pseudo-conjugated minority partially compensated projected laser beam sample 132 which then reflects again from the from surface of the aperture sharing element means 104 to form the reflected pseudo-conjugated minority partially compensated projected laser beam sample 133. The reflected pseudo-conjugated minority partially compensated projected laser beam sample 133 is relayed through the conventional optical system means 123 to the beam splitter means 126 to be directed to the projected laser wavefront sensor means 135.

The net aberration, $w_p$, experienced by the compensated pseudo-conjugate minority partially compensated projected laser beam sample 134 and measured by the projected laser wavefront sensor means 135 is given by, $$w_p = (-1) \times [h + (n-1)ASE_F + (n-1)ASE_{BT} + c_s] + (n-1)ASE_{BT} + 2nASE_F + (n-1)ASE_{BR} + NCP. \quad (Eq4)$$

Where $ASE_{BT}$ is the surface figure aberration of the back surface of the aperture sharing element means 104 in the transmit propagation direction associated with propagation from top to bottom in the orientation of FIG. 1. Equation 6 reduces to, $$w_p = -h - (n-1)ASE_F - c_s + 2nASE_F + (n-1)ASE_{BR} + NCP. \quad (Eq\ 5)$$

Having described the observed wavefront measured by the beacon wavefront sensor means 127 and the projected laser wavefront sensor means 135 discussion turns to description of the commands applied to the conventional primary phase correction device means 106 and the projected laser phase correction device means 102. The beacon wavefront sensor means 127 produces a conventional beacon signal 128 that is processed by the beacon real time controller means 140 to produce the conventional primary phase correction device means command signal 141. The projected laser wavefront sensor means 135 produces a conventional projected laser signal 136 that is processed by the projected laser real time controller means 150 to produce the conventional projected laser phase correction device means command signal 151. The means to process the conventional beacon signal 128 to produce the conventional primary phase correction device means command signal 141 and to process the conventional projected laser signal 136 to produce the conventional projected laser phase correction device means command signal 151 are well known to those skilled in the art of real time control for adaptive optical systems and the exact means will depend on the choice of type of beacon wavefront sensor means 127 and projected laser wavefront sensor means 135. Regardless of the details of implementation, the real time control signals will null the wavefront error observed at the beacon wavefront sensor means 127 and projected laser wavefront sensor means 135. Considering Equation 5, the resultant phase applied by the projected laser phase correction device means 102 will converge at steady state to null Equation 7, $$c_s \Rightarrow -h - (n-1)ASE_F + 2nASE_F + (n-1)ASE_{BR} + NCP. \quad (Eq6)$$

Considering Equation 5, the resultant phase applied by the conventional primary phase correction device means 106 will converge at steady state to null Equation 3, $$c_p \Rightarrow -a - (n-1)ASE_F - (n-1)ASE_{BR} - NCP. \quad (Eq7)$$

Summing the result of Equation 6 and Equation 7 we find resultant phase applied by the conventional primary phase correction device means 106 and projected laser phase correction device means 102 will converge at steady state to, $$c_p + c_s \Rightarrow -a - h + 2ASE_F. \quad (Eq8)$$

The result in Equation 8 matches the result in Equation 2, which in turn corresponds to the desired result of nulling Equation 1—which is the end to end phase aberration experienced from the projected laser source 100 to the target 113. This analysis illustrates that the prior art achieves the desired result of joint compensation of aberrations induced by propagation through a turbulent medium and the aberrations in a laser beam (including the aberrations induced by reflection from the aperture sharing element means 104) utilizing a conventional primary phase correction device means 106 and projected laser phase correction device means 102 in the projected laser beam path.

Figure 2:
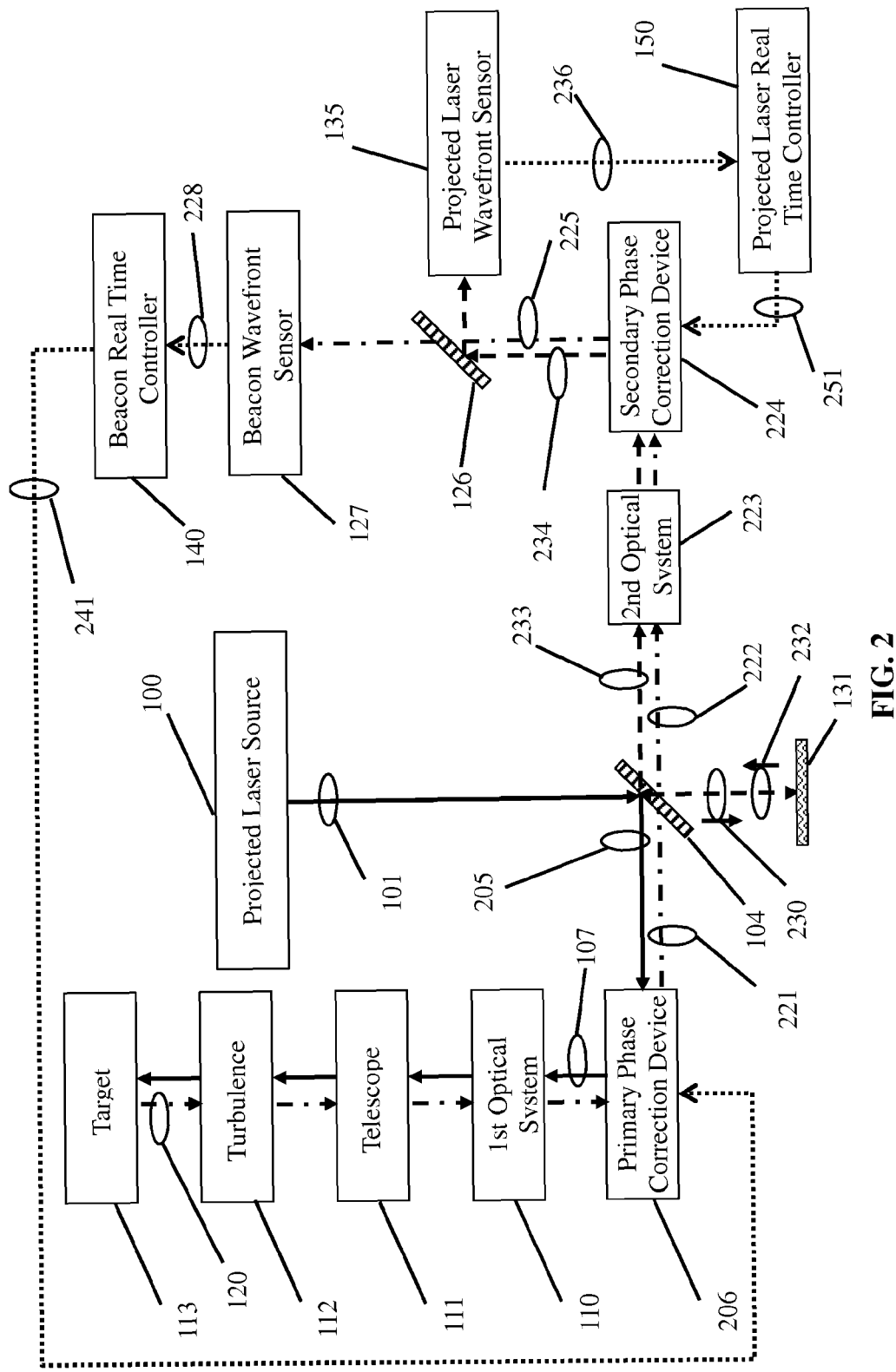
FIG. 2 is a schematic of the first embodiment of the present invention illustrating the measurement and joint compensation of aberrations induced by propagation through a turbulent medium and the aberrations in a laser beam (including the aberrations induced by reflection from the aperture sharing element means) utilizing only a single primary phase correction device means in the projected laser beam path and a secondary phase correction device means incorporated into the wavefront sensor path while at the same time the corrections are made using strictly null-seeking feedback control loops, thus providing a robust means of compensation. The re-location of the secondary phase correction device means from the projected laser beam path to the wavefront sensor path is a useful and non-obvious improvement over the prior art.

FIG. 2 is a schematic of the preferred embodiment of the present invention illustrating the measurement and joint compensation of aberrations induced by propagation through a turbulent medium and the aberrations in a laser beam (including the aberrations induced by reflection from the aperture sharing element means 104) utilizing only a single primary phase correction device means 206 in the projected laser beam path and a secondary phase correction device means 224 incorporated into the wavefront sensor path while at the same time the corrections are made using strictly null-seeking feedback control loops, thus providing a robust means of compensation. The re-location of the secondary phase correction device means 224 from the projected laser beam path to the wavefront sensor path is a useful and non-obvious improvement over the prior art. FIG. 2 is shown by way of example and not of limitation. There are alternate means of displaying the laser path(s) as those skilled in the art would recognize. Shown in FIG. 2 is the projected laser source 100. The projected laser source 100 produces the projected laser beam 101. The projected laser beam 101 encounters an aperture sharing element means 104 which produces a majority projected laser beam sample 205 and minority projected laser beam sample 230. The majority projected laser beam sample 205 transmits to a primary phase correction device means 206 which applies phase correction for joint compensation of aberrations induced by propagation through a turbulent medium and the aberrations in a laser beam (including the aberrations induced by reflection from the ASE) to produce the pre-compensated projected laser beam 107. The primary phase correction device means 206 is understood to be implemented by one of numerous means well known to those skilled in the art, including but not limited to a continuous facesheet deformable mirror, a segmented deformable mirror, or a liquid crystal phase correction device means. The primary phase correction device means 206 could be a plurality of devices in series if this is required to meet dynamic range and/or sampling requirements.

After compensation by the phase correction device means, the pre-compensated projected laser beam 107 transmits through a first optical system means 110 which relays the pre-compensated projected laser beam 107 to a transmitting telescope 111, also commonly known as a beam director, a turbulent medium 112, and to a target 113. It is understood by those skilled in the art that the first optical system means 110 should include additional mirrors and optics required for pointing and stabilization of the beam propagation path from the projected laser source 100 to the target 113. There are numerous means to implement pointing and stabilization well known to those skilled in the art.

We illustrate the correction applied to the pre-compensated projected laser beam 107 mathematically at this point. The sum of the aberrations from the projected laser source 100 to the aperture sharing element means 104 is denoted by h. The sum of the aberrations from the aperture sharing element means 104 to the target 113 is denoted by a. The surface figure of the aperture sharing element means 104 is denoted by $ASE_F$. By inventor-selected convention, the sign of the aberration due to reflection from the aperture sharing element means 104 is negative and thus the aberration experienced by the projected laser beam 101 at the aperture sharing element means 104 due to reflection is $-2ASE_F$. The correction applied by the primary phase correction device means 206 is denoted by $c_p$. Thus, the net aberration, $\phi_p$, experienced by the pre-compensated projected laser beam 107 is given by:

$$\phi_p = h + a + c_p - 2\text{ASE}_F. \quad (Eq9)$$

It is understood that the correction applied by the primary phase correction device means 206 is denoted by $c_p$ should be defined (by as yet unspecified logic) to be such that it corrects the entire propagation path from the projected laser source 100 to the target 113, i.e. the correction applied by the primary phase correction device means 206 should be, $$c_p \Rightarrow -h - a + 2\text{ASE}_F. \quad (Eq10)$$

The means by which this desired correction is achieved will be clear shortly.

A beacon laser beam 120 is formed at the target by one of numerous means well known to those skilled in the art. If the target is a cooperative target then the beacon laser beam 120 is formed within the target 113 and projected by an optical system within the target 113 toward the telescope 111. If the target is a non-cooperative target, then the beacon laser beam 120 is formed by one of numerous means well known to those skilled in the art to form a reflected signal from the target 113 that can be used as a beacon laser source. Such methods include, but are not limited to, those methods described in Ref. 8-10. The beacon laser beam 120 propagates back through the turbulent medium 112, the telescope 111, and the first optical system means 110 which directs the beam to the primary phase correction device means 206 to form the partially compensated beacon laser beam 221. The phrase "partially compensated" is utilized here to emphasize the point that the primary phase correction device means 206 includes correction for both the aberrations induced by propagation through a turbulent medium and the aberrations in a laser beam (including the aberrations induced by reflection from the ASE). At this point, the partially compensated beacon laser beam 121 has been corrected for the return propagation path from the target 113 through the turbulent medium 112, telescope 111, and first optical system means 110, but the conjugate of the aberrations in the laser beam have been introduced by the primary phase correction device means 206 onto the partially compensated laser beam 221.

The net aberration, $\phi_b$, experienced by the partially compensated beacon beam 221 in propagation from the target and after correction by the primary phase correction device means 206 is given by, $$\phi_b = a + c_p. \quad (Eq11)$$

We can see that under the assumption of a perfectly developed command for the primary phase correction device means 206 the net aberration, $\phi_b$, experienced by the partially compensated beacon beam 221 in propagation from the target and after correction by the primary phase correction device means 206 reduces to, $$\phi_b \Rightarrow -h + 2\text{ASE}_F. \quad (Eq12)$$

Given the result in Equation 4 the choice of the term "partially compensated" is clear.

The partially compensated beacon beam 221 transmits through the aperture sharing element means 104 to obtain the partially compensated beacon beam sample 222. The partially compensated beacon beam sample 222 propagates through a second optical system means 223 which relays the partially compensated beacon beam sample 222 to the secondary phase correction device means 224. The secondary phase correction device means 224 is understood to be implemented by one of numerous means well known to those skilled in the art, including but not limited to a continuous facesheet deformable mirror, a segmented deformable mirror, or a liquid crystal phase correction device means. The secondary phase correction device means 224 could be a plurality of devices in series if this is required to meet dynamic range and/or sampling requirements.

After correction by the secondary phase correction device means 224 the partially compensated beacon beam sample 222 is modified to be the fully compensated beacon beam sample 225. The choice of the term "fully compensated" will be clear shortly as the full analysis is carried out to illustrate the principle of operation of the present invention. The fully compensated beacon beam sample 225 passes through a beam splitter means 126 that separates light from the wavelength and/or polarization of the fully compensated beacon beam sample 225 from light at the wavelength and/or polarization of the compensated minority projected laser beam sample 233. After passing through the beam splitter means 126 the fully compensated beacon beam sample 225 is received by the beacon wavefront sensor means 127.

The net aberration, $w_b$, experienced by the fully compensated beacon beam sample 225 and measured by the beacon wavefront sensor means 127 is given by, $$w_b = a + c_p + (n-1)\text{ASE}_F + (n-1)\text{ASE}_{BR} + c_s + NCP. \quad (Eq13)$$

where n is the refractive index of the aperture sharing element means 104, $\text{ASE}_F$ is the surface figure aberration of the front surface of the aperture sharing element means 104, $\text{ASE}_{BR}$ is the surface figure aberration of the back surface of the aperture sharing element means 104 in the receive propagation direction associated with propagation from left to right in the orientation of FIG. 2, $c_s$ is the phase correction applied by the secondary phase correction device means 224, and NCP is the net contribution of all other aberration sources from the aperture sharing element means 104 to the beam splitter means 126. It is assumed that aberrations from the beam splitter means 126 to the beacon wavefront sensor means 127 are well calibrated and negligible.

The discussion of FIG. 2 now returns to the projected laser beam 101. In addition to the majority projected laser beam sample 205 produced by reflection from the aperture sharing element means 104, there is a minority projected laser beam sample 230 produced by transmission through the aperture sharing element means 104. The minority projected laser beam sample 230 encounters a retro-reflecting array means 131 that provides local pseudo-conjugation of the wavefront of the minority projected laser beam sample 230. The retro-reflecting array means 131 can be fabricated using numerous methods well known to those skilled in the art, including, but not limited to an array of corner cubes (as in Ref. 14 and Ref. 15) or an array of Cat-Eye lenses, with the former generally having a larger acceptance angle and the latter having the advantage of not having facets that can cause phase aberrations at a frequency beyond that of the retro-reflecting array. The pitch of the retro-reflecting array means 131 should match the effective pitch of the secondary phase correction device means 224 actuator correction elements and should match the sampling pitch of the projected laser wavefront sensor 135. Reflection of the minority projected laser beam sample 130 produces the pseudo-conjugated minority projected laser beam sample 132 which then reflects again from the from surface of the aperture sharing element means 104 to form the reflected pseudo-conjugated minority projected laser beam sample 233. The reflected pseudo-conjugated minority projected laser beam sample 233 is relayed through the second optical system means 223 to the secondary phase correction device means 224 where the phase correction of the secondary phase correction device means 224 is applied to produce the compensated pseudo-conjugate minority projected laser beam sample 234, which in turn is sampled by the beam splitter means 126 to be directed to the projected laser wavefront sensor means 135.

The net aberration, $w_p$, experienced by the compensated pseudo-conjugate minority projected laser beam sample 234 and measured by the projected laser wavefront sensor means 135 is given by, $$w_p=(-1)\times[h+(n-1)ASE_F+(n-1)ASE_{BT}]+(n-1)ASE_{BT}+2nASE_F+(n-1)ASE_{BR}+c_s+NCP. \quad (Eq14)$$

Where $ASE_{BT}$ is the surface figure aberration of the back surface of the aperture sharing element means 104 in the transmit propagation direction associated with propagation from top to bottom in the orientation of FIG. 2. Equation 14 reduces to, $$w_p=-h-(n-1)ASE_F+2nASE_F+(n-1)ASE_{BR}+c_s+NCP. \quad (Eq15)$$

Having described the observed wavefront measured by the beacon wavefront sensor means 127 and the projected laser wavefront sensor means 135 discussion turns to description of the commands applied to the primary phase correction device means 106 and the secondary phase correction device means 224. The beacon wavefront sensor means 127 produces a beacon signal 228 that is processed by the beacon real time controller means 140 to produce the primary phase correction device means command signal 241. The projected laser wavefront sensor means 135 produces a projected laser signal 236 that is processed by the projected laser real time controller means 150 to produce the secondary phase correction device means command signal 251. The means to process the beacon signal 228 to produce the primary phase correction device means command signal means 241 and to process the projected laser signal 236 to produce the secondary phase correction device means command signal 251 are well known to those skilled in the art of real time control for adaptive optical systems and the exact means will depend on the choice of type of beacon wavefront sensor means 127 and projected laser wavefront sensor means 135. Regardless of the details of implementation, the real time control signals will null the wavefront error observed at the beacon wavefront sensor means 127 and projected laser wavefront sensor means 135. Considering Equation 15, the resultant phase applied by the secondary phase correction device means 224 will converge at steady state to null Equation 15, $$c_s \Rightarrow h+(n-1)ASE_F-2nASE_F-(n-1)ASE_{BR}-NCP. \quad (Eq16)$$

Considering Equation 13, the resultant phase applied by the primary phase correction device means 206 will converge at steady state to null Equation 13, $$c_p \Rightarrow -a-(n-1)ASE_F-(n-1)ASE_{BR}-c_s-NCP. \quad (Eq17)$$

Inserting the result of Equation 16 into Equation 17 we find resultant phase applied by the primary phase correction device means 206 will converge at steady state to, $$c_p \Rightarrow -a-h+2ASE_F. \quad (Eq18)$$

The result in Equation 18 matches the result in Equation 10, which in turn corresponds to the desired result of nulling Equation 9—which is the end to end phase aberration experienced from the projected laser source 100 to the target 113. This analysis illustrates that the present invention achieves the desired result of joint compensation of aberrations induced by propagation through a turbulent medium and the aberrations in a laser beam (including the aberrations induced by reflection from the ASE) utilizing only a single primary phase correction device means 206 in the projected laser beam path and a secondary phase correction device means 224 incorporated into the wavefront sensor path.

I claim:

1. A compensated laser beam projection system comprising:
  a) a projected laser source that produces a projected laser beam which is split by an aperture sharing element means that functions to produce a majority projected laser beam sample and a minority projected laser beam sample;
  b) wherein the majority projected laser beam sample is transmitted through a first optical system means that functions to direct the majority projected laser beam sample to a primary phase correction device means;
  c) wherein said primary phase correction device means functions to pre-compensate the phase of the majority projected laser beam sample to enable focusing the beam through a medium to a target to form a pre-compensated majority projected laser beam sample;
  d) wherein said first optical system means further functions to direct the pre-compensated majority projected laser beam sample through said medium to said target;
  e) wherein the minority projected laser beam sample is transmitted through the aperture sharing element means to a retro-reflector array means that functions to provide a sampled conjugation of a wavefront phase of the minority projected laser beam sample to produce a pseudo-conjugated minority projected laser beam sample; and
  f) wherein the pseudo-conjugated minority projected laser beam sample reflects from the front surface of said aperture sharing element means and is then transmitted through a second optical system means that functions to direct the pseudo-conjugated minority projected laser beam sample to a secondary phase correction device means;
  g) wherein said secondary phase correction device means functions to null a wavefront phase of the pseudo-conjugated minority projected laser beam and to produce a compensated projected laser beam sample;
  h) wherein said second optical system means further functions to direct the compensated projected laser beam sample to a beam splitter means;
  i) wherein said beam splitter means functions to direct the compensated projected laser beam sample to a projected laser wavefront sensor means functioning to measure a wavefront phase of the compensated projected laser beam sample;
  j) wherein a beacon beam is transmitted from the target, through the medium, through said first optical system means that further functions to direct the beacon beam to the primary phase correction device means that further functions to produce a partially compensated beacon beam;
  k) wherein said first optical system means further functions to direct the partially compensated beacon beam to said aperture sharing element means further functioning to produce a partially compensated beacon beam sample;
  l) wherein the partially compensated beacon beam sample is then directed through said second optical system means that further functions to direct the partially compensated beacon beam sample to the secondary phase correction device means;
  m) wherein said secondary phase correction device means further functions to null a wavefront phase of said partially compensated beacon beam sample to produce a compensated beacon beam sample;
  n) wherein said second optical system means further functions to direct said compensated beacon beam sample to said beam splitter means that further functions to direct the compensated beacon beam sample to a beacon wavefront sensor means functioning to measure a wavefront phase of the compensated beacon beam sample;

o) wherein said beacon wavefront sensor means further functions to produce a beacon error signal that is used by a beacon real time processor means that functions to control a wavefront phase of the primary phase correction device means to null the wavefront phase of the compensated beacon beam sample observed on said beacon wavefront sensor means; and p) wherein the projected laser wavefront sensor means further functions to produce a projected laser error signal that is used by a projected laser real time processor means that functions to control a wavefront phase of the secondary phase correction device means to null the wavefront phase of the compensated projected laser beam sample observed on said laser wavefront sensor means.

2. The compensated laser beam projection system of claim 1, wherein the beacon wavefront sensor means further comprises a gain-calibrated knife edge wavefront sensor.

3. The compensated laser beam projection system of claim 1, wherein the beacon wavefront sensor means and the beacon beam further comprises the method of target feature adaptive optics for wavefront sensing.

4. The compensated laser beam projection of claim 1, wherein the beacon wavefront sensor means further comprises a conventional Hartmann sensor in the Fried-geometry.

5. The compensated laser beam projection system of claim 1, wherein the beacon wavefront sensor means further comprises a conventional Dual-Hartmann sensor in the Hutchin-geometry.

6. The compensated laser beam projection system of claim 1, wherein the beacon wavefront sensor means further comprises a Self-Referencing Interferometer.

7. The compensated laser beam projection system of claim 1, wherein the projected laser wavefront sensor means further comprises a gain-calibrated knife edge wavefront sensor.

8. The compensated laser beam projection system of claim 1, wherein the projected laser wavefront sensor means further comprises a conventional Hartmann sensor in the Fried-geometry.

9. The compensated laser beam projection system of claim 1, wherein the projected laser wavefront sensor means further comprises a conventional Dual-Hartmann sensor in the Hutchin-geometry.

10. The compensated laser beam projection system of claim 1, wherein the projected laser wavefront sensor means further comprises a Self-Referencing Interferometer.

11. The compensated laser beam projection system of claim 1, wherein said beacon beam originates at the target by means of active laser illumination of the target.

12. The compensated laser beam projection system of claim 1, wherein said beacon beam originates at the target by means of reflected sunlight or reflected ambient light from the target.

13. The compensated laser beam projection system of claim 1, wherein said beacon beam originates at the target by means of projection of a laser beam from the target.

14. The compensated laser beam projection system of claim 1, wherein said beacon beam originates at the target by means of thermal emission from the target.

15. The compensated laser beam projection system of claim 1, wherein the primary phase correction device means further comprises a plurality of primary phase correction device means.

16. The compensated laser beam projection system of claim 1, wherein the primary phase correction device means further comprises a reflective primary phase correction device means.

17. The compensated laser beam projection system of claim 1, wherein the primary phase correction device means further comprises a plurality of reflective primary phase correction device means.

18. The compensated laser beam projection system of claim 1, wherein the secondary phase correction device means further comprises a plurality of primary phase correction device means.

19. The compensated laser beam projection system of claim 1, wherein the secondary phase correction device means further comprises a reflective secondary phase correction device means.

20. The compensated laser beam projection system of claim 1, wherein the secondary phase correction device means further comprises a plurality of reflective secondary phase correction device means.

21. The compensated laser beam projection system of claim 1, wherein the medium further comprises a turbulent optical propagation path.

22. A compensated laser beam projection method comprising the steps of:

a) projecting a laser beam to an aperture sharing element means that functions to produce a majority projected laser beam sample and a minority projected laser beam sample;

b) directing the majority projected laser beam sample through a first optical system means that functions to direct the majority projected laser beam sample to a primary phase correction device means that functions to pre-compensate the phase of the majority projected laser beam sample to enable focusing the beam through a medium to a target to form a pre-compensated majority projected laser beam sample;

c) wherein said first optical system means further functions to direct the pre-compensated majority projected laser beam sample through said medium to said target;

d) directing the minority projected laser beam sample through the aperture sharing element means to a retro-reflector array means that functions to provide a sampled conjugation of a wavefront phase of the minority projected laser beam sample to produce a pseudo-conjugated minority projected laser beam sample;

e) directing the pseudo-conjugated minority projected laser beam sample to reflect from the front surface of said aperture sharing element means and then transmitting through a second optical system means that functions to direct the pseudo-conjugated minority projected laser beam sample to a secondary phase correction device means that functions to null a wavefront phase of the pseudo-conjugated minority projected laser beam and to produce a compensated projected laser beam sample;

f) directing the compensated projected laser beam sample to a beam splitter means that functions to direct the compensated projected laser beam sample to a projected laser wavefront sensor means functioning to measure a wavefront phase of the compensated projected laser beam sample;

g) wherein the projected laser wavefront sensor means further functions to produce a projected laser error signal;

h) forming a beacon beam that transmits from the target, through the medium, through said first optical system means that further functions to direct the beacon beam to the primary phase correction device means that further functions to produce a partially compensated beacon beam;

i) passing the partially compensated beacon beam through said aperture sharing element means functioning to produce a partially compensated beacon beam sample; and j) directing the partially compensated beacon beam sample through said second optical system means that further functions to direct the partially compensated beacon beam sample to the secondary phase correction device means that functions to null a wavefront phase of said partially compensated beacon beam sample to produce a compensated beacon beam sample;

k) directing the compensated beacon beam sample to a beam splitter means that functions to direct the compensated beacon beam sample to a beacon wavefront sensor means functioning to measure a wavefront phase of the compensated beacon beam sample;

l) wherein the beacon wavefront sensor means further functions to produce a beacon error signal;

m) processing said beacon error signal to control a wavefront phase of the primary phase correction device means to null the wavefront phase of the compensated beacon beam sample observed on said beacon wavefront sensor means; and n) processing said projected laser error signal to control a wavefront phase of the secondary phase correction device means to null the wavefront phase of the compensated projected laser beam sample observed on said laser wavefront sensor means.

23. The compensated laser beam projection method of claim 22 further comprising the step of forming an optical configuration wherein the beacon wavefront sensor means functions as a gain-calibrated knife edge wavefront sensor.

24. The compensated laser beam projection method of claim 22 further comprising the step of forming an optical configuration wherein the beacon wavefront sensor means and the beacon beam function to implement the method of target feature adaptive optics for wavefront sensing.

25. The compensated laser beam projection method of claim 22 further comprising the step of forming an optical configuration wherein the beacon wavefront sensor means functions as a conventional Hartmann sensor in the Fried-geometry.

26. The compensated laser beam projection method of claim 22 further comprising the step of forming an optical configuration wherein the beacon wavefront sensor means functions as a conventional Dual-Hartmann sensor in the Hutchin-geometry.

27. The compensated laser beam projection method of claim 22 further comprising the step of forming an optical configuration wherein the beacon wavefront sensor means functions as a Self-Referencing Interferometer.

28. The compensated laser beam projection method of claim 22 further comprising the step of forming an optical configuration wherein the projected laser wavefront sensor means functions as a gain-calibrated knife edge wavefront sensor.

29. The compensated laser beam projection method of claim 22 further comprising the step of forming an optical configuration wherein the projected laser wavefront sensor means functions as a conventional Hartmann sensor in the Fried-geometry.

30. The compensated laser beam projection method of claim 22 further comprising the step of forming an optical configuration wherein the projected laser wavefront sensor means functions as a conventional Dual-Hartmann sensor in the Hutchin-geometry.

31. The compensated laser beam projection method of claim 22 further comprising the step of forming an optical configuration wherein the projected laser wavefront sensor means functions as a Self-Referencing Interferometer.

32. The compensated laser beam projection method of claim 22 further comprising the step of forming an optical configuration wherein said beacon beam originates at the target by means of active laser illumination of the target.

33. The compensated laser beam projection method of claim 22 further comprising the step of forming an optical configuration wherein said beacon beam originates at the target by means of reflected sunlight or reflected ambient light from the target.

34. The compensated laser beam projection method of claim 22 further comprising the step of forming an optical configuration wherein said beacon beam originates at the target by means of projection of a laser beam from the target.

35. The compensated laser beam projection method of claim 22 further comprising the step of forming an optical configuration wherein said beacon beam originates at the target by means of thermal emission from the target.

36. The compensated laser beam projection method of claim 22 further comprising the step of forming an optical configuration wherein the primary phase correction device means further comprises a plurality of primary phase correction device means.

37. The compensated laser beam projection method of claim 22 further comprising the step of forming an optical configuration wherein the primary phase correction device means further comprises a reflective primary phase correction device means.

38. The compensated laser beam projection method of claim 22 further comprising the step of forming an optical configuration wherein the primary phase correction device means further comprises a plurality of reflective primary phase correction device means.

39. The compensated laser beam projection method of claim 22 further comprising the step of forming an optical configuration wherein the secondary phase correction device means further comprises a plurality of primary phase correction device means.

40. The compensated laser beam projection method of claim 22 further comprising the step of forming an optical configuration wherein the secondary phase correction device means further comprises a reflective secondary phase correction device means.

41. The compensated laser beam projection method of claim 22 further comprising the step of forming an optical configuration wherein the secondary phase correction device means further comprises a plurality of reflective secondary phase correction device means.

42. The compensated laser beam projection method of claim 22 further comprising the step of projecting the pre-compensated majority projected laser beam sample and the beacon beam through the medium wherein the medium further comprises a turbulent optical propagation path.

43. An improvement to a compensated laser beam projection system, which includes a laser transmitter which produces a laser beam, and in combination with a beacon beam which is received, a compensated laser beam projection system having:

an aperture sharing element which receives and splits said laser beam from said laser transmitter to produce an outgoing laser beam and a sample beam, said aperture sharing element receiving and reflecting a conjugated sample beam, said aperture sharing element also passing said beacon beam through it;

a retro-reflector array which receives said sample beam from said aperture sharing element, said retro-reflector array producing a conjugated sample beam by reflecting said sample beam while conjugating errors in said sample beam, said retro-reflector array sending said conjugated sample beam back to said aperture sharing element;

a means for measuring a wavefront phase of said conjugated sample beam and a wavefront phase of said beacon beam, said measuring means receiving said conjugated sample beam and said beacon beam from said aperture sharing element;

and a primary phase correction device means that functions to receive said outgoing laser beam from said aperture sharing element, said primary phase correction device means further functioning to adjust said outgoing laser beam so that it becomes a conjugate of said beacon beam by adjusting said outgoing laser beam to remove any wavefront phase differences between said outgoing laser beam and said beacon beam;

wherein the improvement comprises:
- a) a secondary phase correction device means that functions to apply a secondary wavefront phase to said conjugated sample beam and said beacon beam from said aperture sharing element before said conjugated sample beam and said beacon beam are received by said measuring means;
- b) said measuring means further functioning to provide a beacon beam output signal by measuring said wavefront phase of said beacon beam;
- c) said measuring means further functioning to provide a projected laser beam output signal by measuring said wavefront phase of said projected laser beam;
- d) said primary phase correction device means further functioning to receive said beacon beam output signal from said measuring means, said primary phase correction device means further functioning to null said wavefront phase of said beacon beam measured by said measuring means; and
- e) said secondary phase correction device means further functioning to receive said projected laser beam output signal from said measuring means, said secondary phase correction device means further functioning to null said wavefront phase of said projected laser beam measured by said measuring means.

44. A compensated laser beam projection system having:
- a) a laser transmitter which produces a laser beam;
- b) a beacon beam which is received;
- c) an aperture sharing element means that functions to receive and split said laser beam from said laser transmitter to produce an outgoing laser beam and a sample beam;
- d) said aperture sharing element means further functioning to receive and reflect a conjugated sample beam, said aperture sharing element means further functioning to pass said beacon beam through it;
- e) a conjugation means which functions to receive said sample beam from said aperture sharing element means, said conjugation means further functioning to produce a conjugated sample beam by reflecting said sample beam while conjugating errors in said sample beam, said conjugation means further functioning to send said conjugated sample beam back to said aperture sharing element means;
- f) a means for measuring a wavefront phase of said conjugated sample beam and a wavefront phase of said beacon beam, said measuring means receiving said conjugated sample beam and said beacon beam from said aperture sharing element means;
- g) said measuring means further functioning to provide a beacon beam output signal by measuring said wavefront phase of said beacon beam;
- h) said measuring means further functioning to provide a projected laser beam output signal by measuring said wavefront phase of said projected laser beam;
- i) a primary phase correction device means that functions to receive said outgoing laser beam from said aperture sharing element, said primary phase correction device means further functioning to adjust said outgoing laser beam using information from said beacon beam output signal and/or said projected laser beam output signal so that it becomes a conjugate of said beacon beam by adjusting said outgoing laser beam to remove any wavefront phase differences between said outgoing laser beam and said beacon beam; and
- j) a secondary phase correction device means that functions to apply a secondary wavefront phase using information from said beacon beam output signal and/or said projected laser beam output signal to said conjugated sample beam and said beacon beam from said aperture sharing element before said conjugated sample beam and said beacon beam are received by said measuring means.

* * * * *